(12) United States Patent
Izumiya et al.

(10) Patent No.: US 8,356,313 B2
(45) Date of Patent: Jan. 15, 2013

(54) REDUCED THICKNESS DISC DRIVE APPARATUS

(75) Inventors: Yusuke Izumiya, Kanagawa (JP); Manabu Obata, Kanagawa (JP); Kiyoshi Omori, Tokyo (JP)

(73) Assignee: Sony Optiarc Inc., Tokyo (JP)

( * ) Notice: Subject to any disclaimer, the term of this patent is extended or adjusted under 35 U.S.C. 154(b) by 449 days.

(21) Appl. No.: 12/485,225

(22) Filed: Jun. 16, 2009

(65) Prior Publication Data
US 2009/0320053 A1    Dec. 24, 2009

(30) Foreign Application Priority Data

Jun. 20, 2008   (JP) ................................. 2008-162590

(51) Int. Cl.
*G11B 33/12* (2006.01)
(52) U.S. Cl. ....................................... 720/652
(58) Field of Classification Search .......... 720/619–625, 720/646–647, 652–653
See application file for complete search history.

(56) References Cited

U.S. PATENT DOCUMENTS

| | | | | |
|---|---|---|---|---|
| 5,467,235 A | * | 11/1995 | Watanabe | 360/99.06 |
| 5,805,378 A | * | 9/1998 | Konno et al. | 360/97.01 |
| 6,918,128 B2 | * | 7/2005 | Hasegawa et al. | 720/647 |
| 7,050,255 B2 | * | 5/2006 | Price et al. | 360/66 |
| 7,434,238 B2 | * | 10/2008 | Kirihara et al. | 720/652 |
| 7,559,069 B2 | * | 7/2009 | Sekita | 720/671 |
| 7,603,679 B2 | | 10/2009 | Fujimura | |
| 7,636,925 B2 | * | 12/2009 | Omori | 720/652 |
| 7,805,737 B2 | * | 9/2010 | Yamada et al. | 720/622 |
| 2004/0222712 A1 | * | 11/2004 | Hong et al. | 310/67 R |
| 2007/0169135 A1 | * | 7/2007 | Omori et al. | 720/658 |
| 2007/0300245 A1 | * | 12/2007 | Tsutsumi et al. | 720/619 |
| 2008/0010650 A1 | * | 1/2008 | Fujisawa | 720/623 |
| 2008/0150985 A1 | | 6/2008 | Ikemoto et al. | |
| 2008/0170480 A1 | | 7/2008 | Ikemoto et al. | |
| 2009/0031333 A1 | * | 1/2009 | Wada | 720/620 |

FOREIGN PATENT DOCUMENTS

| | | |
|---|---|---|
| JP | 2001-351291 A | 12/2001 |
| JP | 2004-158194 A | 6/2004 |
| JP | 2005100595 A * | 4/2005 |
| JP | P2005-100595 A | 4/2005 |

\* cited by examiner

*Primary Examiner* — Brian Miller
(74) *Attorney, Agent, or Firm* — Wolf, Greenfield & Sacks, P.C.

(57) ABSTRACT

A disc drive apparatus includes: an apparatus body to which a disc is inserted and from which the disc is ejected; a disc recording and reproducing unit having a disc loading unit configured to load the disc inserted into the apparatus body, a disc rotation drive mechanism configured to rotate the disc loaded onto the disc loading unit, an optical pickup configured to record and/or reproduce a data signal with respect to the disc, and a pickup feeding mechanism configured to convey the optical pickup in a radial direction of the disc; a disc conveying mechanism configured to insert the disc into the apparatus body and eject the disc from the apparatus body; and a conveyance drive mechanism provided in the apparatus body and configured to drive the disc conveying mechanism; wherein the apparatus body includes a shoulder which is reduced in thickness in the vicinity of an insertion end of the disc.

7 Claims, 9 Drawing Sheets

PRIOR ART

REDUCED THICKNESS DISC DRIVE APPARATUS

BACKGROUND OF THE INVENTION

1. Field of the Invention

The present invention relates to a disc drive apparatus configured to record and reproduce a data signal with respect to an optical disc and, more specifically, to so called a slot-in type disc drive apparatus to which the optical disc is directly inserted into an apparatus body.

2. Description of the Related Art

In the related art, optical discs such as Compact Discs (CD), Digital Versatile discs (DVD), and Blue-ray Discs (BD), and optical magnetic discs such as Magneto optical (MO) or Mini Discs (MD) are widely known, and various types of disc drive apparatuses which accommodate these discs or disc cartridges are already in the market.

The disc drive apparatus includes a type configured to open a lid or a door provided on a housing and load a disc directly onto a turn table exposed therefrom, a type configured to place a disc on a disc tray coming out from and being retracted into the housing in the horizontal direction so that the disc is automatically loaded onto a turn table provided therein when the disc tray is retracted into the apparatus, and a type configured to load a disc directly onto a turn table provided on the disc tray. However, with any of these types, an operator performs operations such as opening or closing the lid or the door, causing the disc tray to come out or retract, or loading the disc onto the turn table.

In contrast, there is so-called a slot-in type disc drive apparatus configured to load the disc automatically onto the turn table only by inserting the disc from a disc slot provided on the front surface of the housing. In the field of mobile apparatuses on which the slot-in type disc drive apparatus is mounted such as a laptop personal computer, further reduction in size and thickness is demanded, and a demand of reduction in size and thickness of the disc drive apparatus is increasing corresponding thereto. In view of such background, as one of the slot-in type disc drive apparatuses, there is proposed a disc drive apparatus having a plurality of rotating arms having an abutment portion which comes into abutment with the outer periphery of a disc inserted from the disc slot on a front panel provided at a distal end portion thereof and rotatably supported at proximal end portions thereof, and is configured to perform a loading operation to retract the disc from the disc slot into the interior of the housing by rotating the rotating arms in a plane parallel to the disc and an ejecting operation to eject the disc from the disc slot out of the housing (see JP-A-2005-100595). Among the disc drive apparatuses which achieve the reduction in thickness, there are proposed ultra-thin disc drive apparatuses to be mounted to a laptop personal computer or the like such as those having a thickness of 12.7 mm, or those being reduced in thickness to 9.5 mm, which is as thin as a hard disk drive (HDD) unit.

The disc drive apparatus mounted in the related art is provided with a front panel on a drive body, and is configured to expose the front panel from an apparatus body of the laptop personal computer. However, the apparatus bodies of the laptop personal computers having the disc drive apparatus mounted therein have now various designs. Therefore, there is a demand not to provide the front panel on the disc drive apparatus, and make the apparatus body of the computer function as the front panel.

Figure 10:
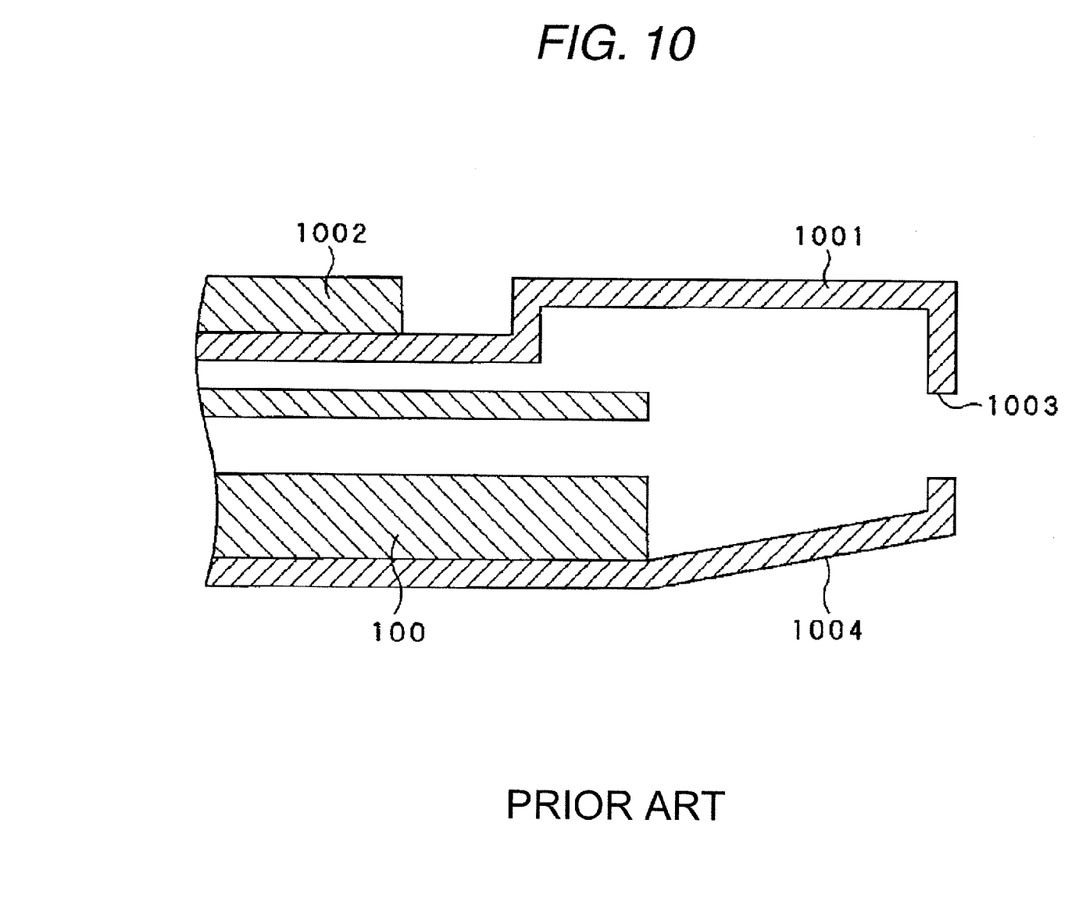
FIG. 10 is a cross-sectional view showing a disc drive apparatus in the related art in a state of being mounted on a compute apparatus body.

A disc drive apparatus which satisfies such demand is shown in FIG. 10. A disc drive apparatus 100 shown in FIG. 10 is so-called a slot-in type disc drive apparatus, and is mounted to an apparatus body 1001 of a laptop personal computer 1000. The disc drive apparatus 100 is fixed in the apparatus body 1001 so as to allow insertion and ejection of a disc via a disc slot 1003 formed on a side surface of the substantially rectangular apparatus body 1001. Specifically, in the laptop personal computer 1000, the disc drive apparatus 100 is fixed to a space right below a keyboard 1002 of the apparatus body 1001. The disc drive apparatus 100 is not provided directly with a front panel, and the apparatus body 1001 also functions as the front panel.

Assuming that an inclined portion 1004 is formed on the apparatus body 1001 for the purpose of improvement of its design, since the apparatus body 1001 by itself is also reduced in size and thickness, a mounting space for the disc drive apparatus 100 is limited, and hence it may be necessary to arrange the disc drive apparatus 100 at a position avoiding the inclined portion 1004. In this case, as shown in FIG. 10, the disc drive apparatus 100 is to be configured in such a manner that the disc slot 1003 of the apparatus body 1001 of the computer and the disc slot on the disc drive apparatus 100 are positioned apart. In the state of being apart from each other as described above, an event such that insertion of the disc into the disc drive apparatus 100 is not achieved depending on the direction of insertion of the disc from the disc slot 1003 may occur. Also, a space formed between these members being apart is a wasted space.

In addition, due to the space formed between the members being apart, the disc ejected from the disc drive apparatus 100 may not be exposed sufficiently out from the housing, so that an event such that a user has a difficulty to catch the ejected disc properly occurs.

SUMMARY OF THE INVENTION

It is desirable to provide a disc drive apparatus which is allowed to be mounted on apparatus bodies of electronic instruments such as computers having a low-profile and various designs, and the electronic instrument having the same.

According to an embodiment of the present invention, there is provided a disc drive apparatus including an apparatus body to which a disc is inserted and from which the disc is ejected;

a disc recording and reproducing unit having a disc loading unit configured to load the disc inserted into the apparatus body, a disc rotation drive mechanism configured to rotate the disc loaded onto the disc loading unit, an optical pickup configured to record and/or reproduce a data signal with respect to the disc, and a pickup feeding mechanism configured to convey the optical pickup in a radial direction of the disc;

a disc conveying mechanism configured to insert the disc into the apparatus body and eject the disc from the apparatus body; and a conveyance drive mechanism provided in the apparatus body and configured to drive the disc conveying mechanism, in which the apparatus body includes a shoulder which is reduced in thickness in the vicinity of an insertion end of the disc.

According to another embodiment of the present invention, there is also provided an electronic instrument including an instrument body having a horizontal surface portion, an inclined surface portion continuing from the horizontal surface portion, and an opening opened in the vicinity of the inclined surface portion and to which a disc is inserted and from which the disc is ejected; and a disc drive apparatus including an apparatus body to which the disc is inserted and from which the disc is ejected, a disc recording and reproducing unit having a disc loading unit configured to load the disc inserted into the apparatus body, a disc rotation drive mechanism configured to rotate the disc loaded onto the disc loading unit, an optical pickup configured to record and/or reproduce a data signal with respect to the disc, and a pickup feeding mechanism configured to convey the optical pickup in a radial direction of the disc, a disc conveying mechanism configured to insert the disc into the apparatus body and eject the disc from the apparatus body, and a conveyance drive mechanism provided in the apparatus body and configured to drive the disc conveying mechanism, in which the apparatus body includes a shoulder which is reduced in thickness corresponding to the inclined surface portion in the vicinity of an insertion end of the disc.

According to the embodiments of the invention, the apparatus body includes the shoulder which is reduced in thickness in the vicinity of the insertion end so as to allow easy installation at a position which achieves sufficient ejection of the disc in the electronic instrument having a non-horizontal surface such as an inclined portion.

DESCRIPTION OF THE PREFERRED EMBODIMENTS

Figure 1:
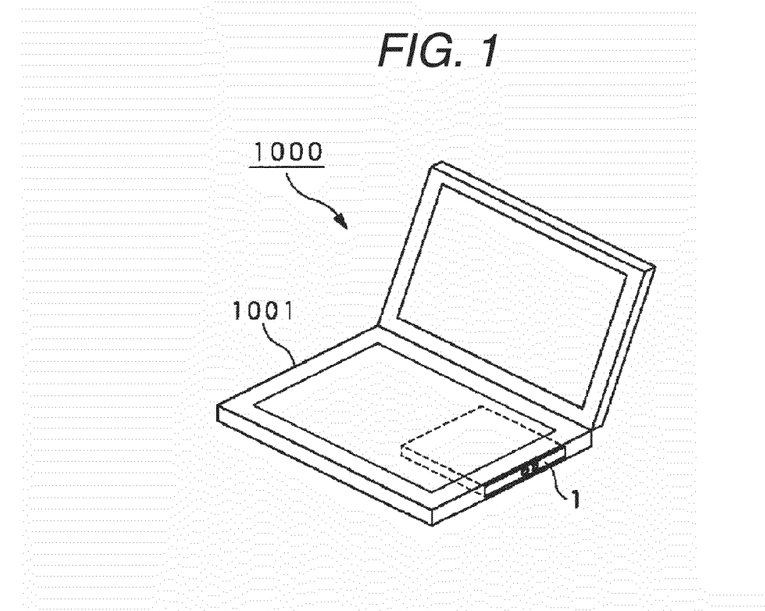
FIG. 1 is a perspective view showing an appearance of an electronic instrument in which a disc drive apparatus according to an embodiment of the present invention is mounted.

Referring now to the drawings, a disc drive apparatus according to embodiments of the present invention will be described in detail. A disc drive apparatus 1 is, for example, an ultra-thin slot-in type disc drive apparatus 1 mounted on an apparatus body 1001 of a laptop personal computer 1000, as shown in FIG. 1. The disc drive apparatus 1 has a structure which is reduced in thickness entirely to about 9.5 mm, which is the same thickness as, for example, a hard disk drive (HDD) unit, as shown in FIG. 2, and is able to record and reproduce a data signal with respect to an optical disc 2 such as Compact Discs (CD), Digital Versatile Discs (DVD), or Blue-ray Discs (BD).

The disc drive apparatus 1 includes a housing 3 as an apparatus body to which the optical disc 2 is inserted or from which the optical disc 2 is removed, a base unit 21 as a disc recording and reproducing unit configured to perform recording and reproduction with respect to the optical disc 2, a disc conveying mechanism 40 configured to convey the optical disc 2 onto the base unit 21 in the housing 3 and eject the same out from the housing 3, and a conveyance drive mechanism 60 configured to drive the disc conveying mechanism 40.

Specifically, as shown in FIGS. 2 to 6B, the disc drive apparatus 1 includes the housing 3 which corresponds to an outer shell of the apparatus body, and the housing 3 includes a bottom case 4 of a substantially flat box shape which corresponds to a lower housing, and a top cover 5 which corresponds to a top panel configured to cover an upper opening of the bottom case 4. Mounted in the housing 3 of the disc drive apparatus 1 is a main chassis 6 which allows the base unit 21, described later, to be exposed upward and covers a conveyance drive motor 61 of the conveyance drive mechanism 60 configured to provide a drive force for conveying the disc, and the disc conveying mechanism 40 configured to insert the optical disc 2 into the housing 3 and to eject the same out from the housing 3 by the drive force of the conveyance drive motor 61 transmitted thereto.

Figure 2:
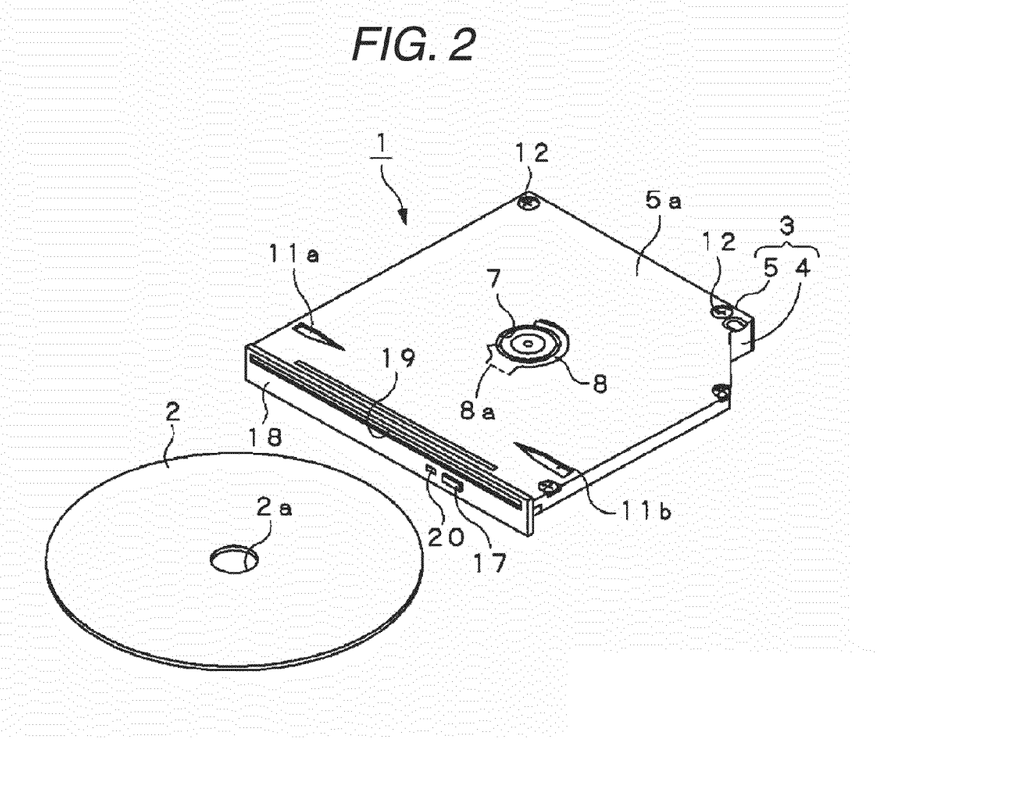
FIG. 2 is a perspective view showing an appearance of the disc drive apparatus according to the embodiment of the present invention.
Figure 5:
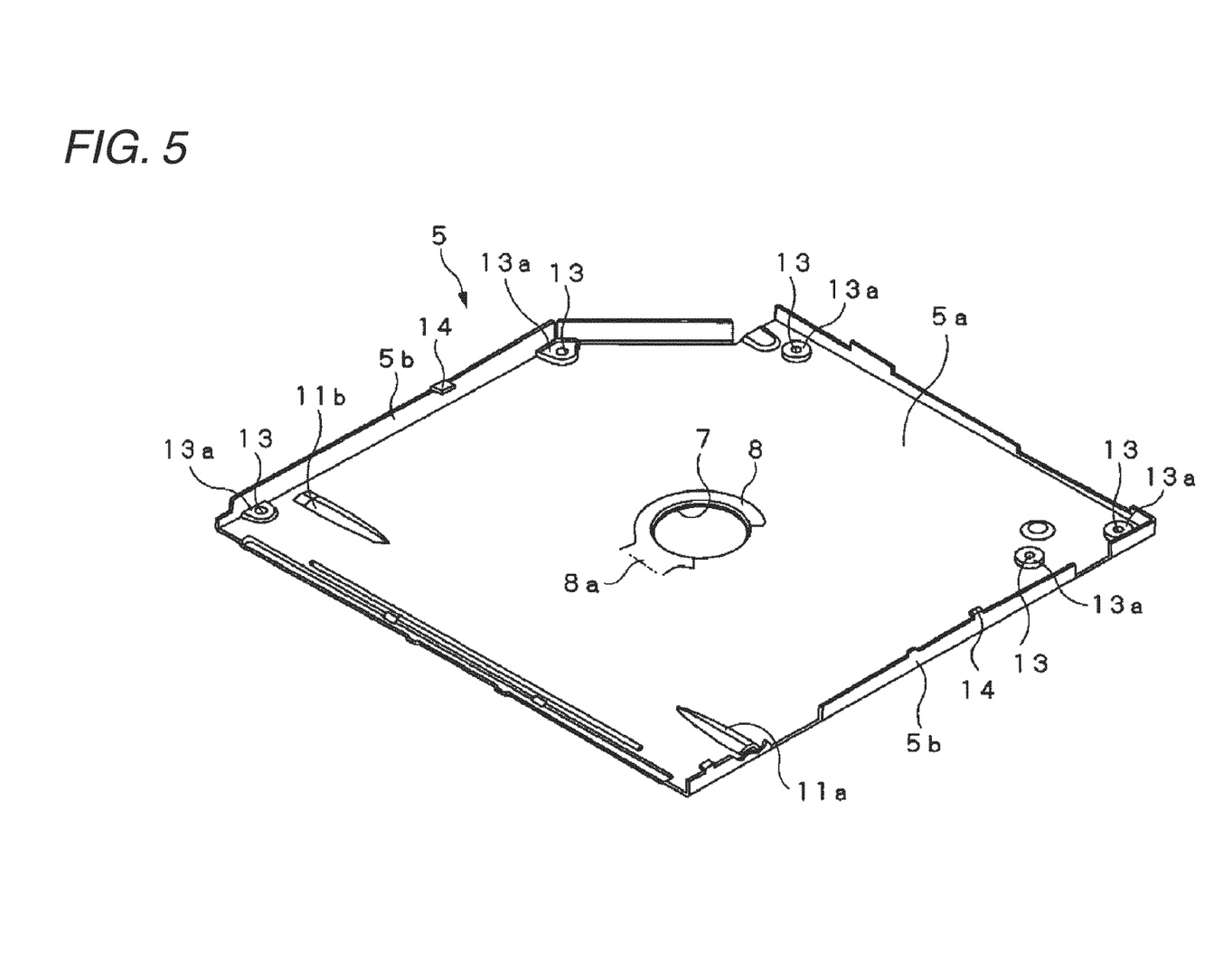
FIG. 5 is a perspective view showing an appearance of a top cover.

As shown in FIGS. 2 and 5, the top cover 5 is formed of a thin sheet metal and includes a top panel portion 5a configured to close the upper opening of the bottom case 4 and a pair of side panel portions 5b formed by slightly bending the periphery of the top panel portion 5a along the both side surfaces of the bottom case 4. The top cover 5 is formed of a thin aluminum plate, and anodic oxidation for generating an oxidation coating, that is, anodizing is applied on the aluminum plate. The top cover 5 has a thickness of about 0.4 mm after the anodizing, for example. The top panel portion 5a is formed with a substantially circular opening 7 at a substantially center portion thereof. The opening 7 is formed for allowing an engaging projection 23b of a turn table 23a being engaged with a center hole 2a of the optical disc 2 to be exposed toward the outside at the time of a chucking operation, described later. The top panel portion 5a is also formed with an abutment projection 8 around the opening 7 thereof so as to project slightly inwardly of the housing 3 to allow the abutment with the periphery of the center hole 2a of the optical disc 2 held on the turn table 23a.

Figure 3:
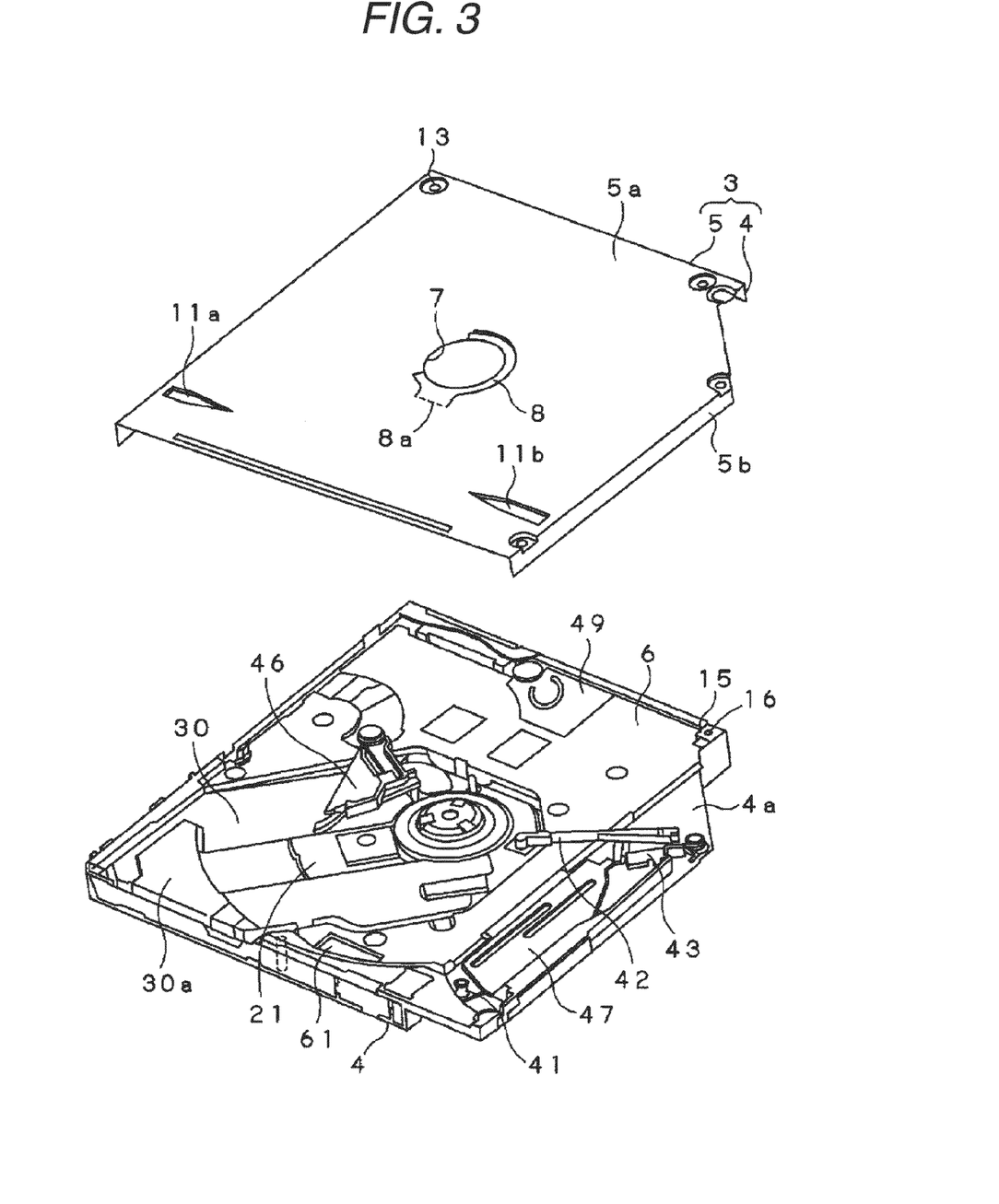
FIG. 3 is a perspective view showing an interior of the disc drive apparatus according to the embodiment of the present invention.

The abutment projection 8 provided on the top panel portion 5a includes a guide projection 8a configured to guide the optical disc 2 while regulating the same in the height direction so as not to hinder an insertion of the optical disc 2 by a collision with the abutment projection 8 on a disc slot 19 side, described later. The guide projection 8a is formed into a tapered shape swelling from the top panel portion 5a on the side of the direction of insertion of the optical disc 2 which passes under the abutment projection 8 to the same level as the abutment projection 8. The abutment projection 8 prevents the inserted optical disc 2 from colliding with the abutment projection 8, and guides the same to pass smoothly under the abutment projection 8. The rigidity of the top cover 5 near the opening 7 of the top panel portion 5a is enhanced by the provision of the guide projection 8a having the shape as described above. The abutment projection 8 and the guide projection 8a provided on the top panel portion 5a are mainly intended to allow smooth insertion and chucking operation of the optical disc 2, and are not limited to the shape as shown in FIG. 3.

The top cover 5 configured as described above is formed with the anodic oxidation coating over the entire portion of the aluminum plate as a base material, so that the durability and the abrasion resistance property are improved, damage caused by collision of the optical disc 2 is restrained, and splash of cutting dust of the top cover caused by the collision within the apparatus is restrained. Since the top cover 5 may be reduced in thickness of the material while maintaining the equivalent strength, it contributes to reduction in thickness of the entire disc drive apparatus 1. In other words, while an aluminum plate having a thickness of 0.5 mm has been used as the top cover in the related art, the same strength as in the related art is maintained in the top cover 5 according to the embodiment of the present invention even when the thickness is reduced to 0.4 mm after the anodizing. In addition, since the sliding property of the top cover 5 is improved, even when the optical disc 2 comes into sliding contact with the top cover 5, smooth insertion and ejection are achieved, so that reduction of a margin of an excessive space in the height direction of the disc drive apparatus 1 is achieved, which contributes to the reduction in thickness.

The top panel portion 5a is formed with a pair of guide projections 11a and 11b on the front surface side thereof so as to protrude inwardly of the housing 3, which guide the optical disc 2 inserted from the disc slot 19, described later, while regulating the same in the height direction. The pair of guide projections 11a and 11b are swelled at substantially symmetrical positions with respect to a center line of the optical disc 2 passing over the opening 7 along the direction of insertion so as to assume an arc in the direction of insertion of the optical disc 2, and have a substantially partial conical shape swelled so as to be reduced in diameter of the arc continuously from the outside to the inside along the direction substantially orthogonal to the direction of insertion of the optical disc 2. In other words, the pair of guide projections 11a and 11b have a shape such that a cone is divided into two halves along the axial direction thereof, and the respective halves are placed with apexes directed inwardly, and hence are reduced in height and width from the outsides toward the insides.

With the shape of the pair of guide projections 11a and 11b as described above, the optical disc 2 inserted from the disc slot 19 is guided smoothly into the interior of the housing 3 while correcting the widthwise displacement thereof. The rigidity of the top panel portion 5a of the top cover 5 is enhanced by the provision of the guide projections 11a and 11b having the shape as described above.

The top cover 5 is not limited to be formed with the anodic oxidation coating entirely over the material including the side panel portions 5b, as described above, and may be formed with the anodic oxidation coating only in a sliding area where the optical disc 2 might come into sliding contact, that is, only over the guide projection 8a, portions near the guide projections 11a and 11b, or the inner surface side of the top panel portion 5a. Conditions of formation of the anodic oxidation coating on the aluminum base material are based on the known conditions such that sulfuric acid, oxalic acid, or the like is used as electrolytic solution. The base material of the top cover 5 is not limited to aluminum, and any known materials such as magnesium and titanium may be used as long as the anodic oxidation coating maybe formed thereon. However, in terms of the cost and the strength, aluminum or aluminum alloy is preferable.

Figure 6A:
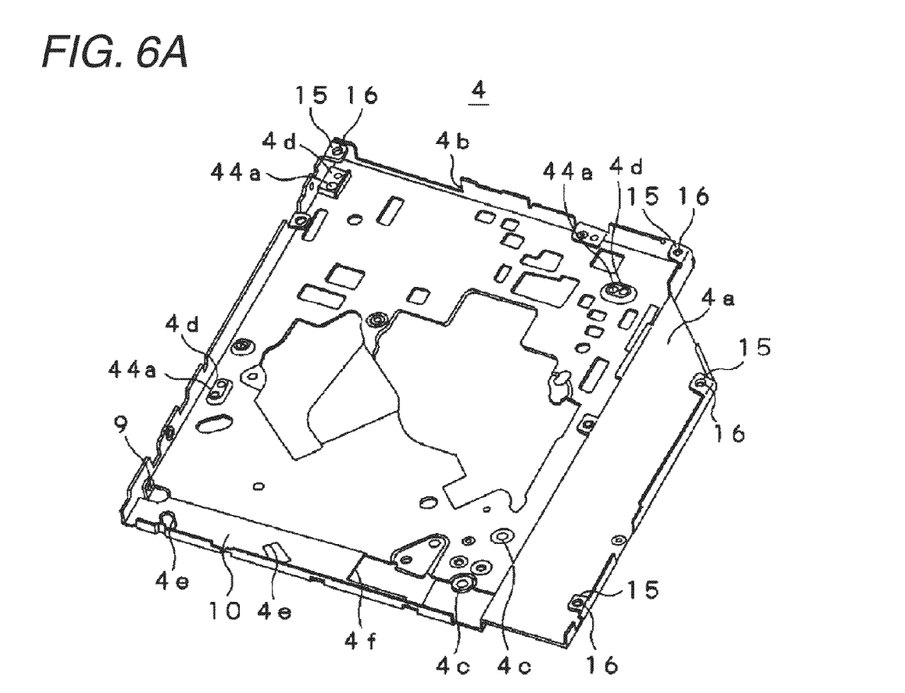
FIG. 6A is a perspective view showing an appearance of an inner side of a bottom case.
Figure 6B:
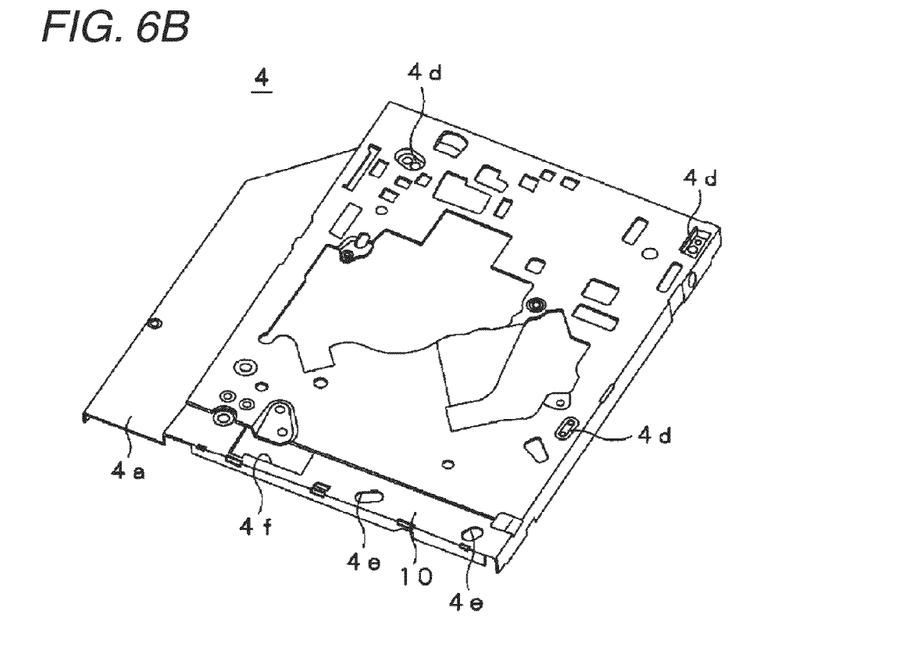
FIG. 6B is a perspective view showing an appearance of an outer side of the bottom case.

As shown in FIGS. 6A and 6B, the bottom case 4 is formed of a sheet metal formed into the substantially flat box shape and a bottom surface portion is formed into a substantially rectangular shape, and one of side surface portions is provided with a deck portion 4a having a bottom level higher than the bottom surface portion and protruding outward. The bottom case 4 is formed of a thin aluminum plate and anodic oxidation for generating an oxidation coating, that is, anodizing is applied on the aluminum plate like the top cover 5. The bottom case 4 has a thickness of about 0.4 mm after the anodizing. The deck portion 4a is configured to rotatably support a loading arm 41 which retracts the optical disc 2 into the housing 3, a deck arm 42 configured to prevent erroneous insertion of an optical disc having a small diameter of 8 cm and center the optical disc 2 having a large diameter, and a regulating arm 43 configured to control an urging force of the deck arm 42, which constitute the disc conveying mechanism 40.

On the bottom surface portion of the bottom case 4, a circuit substrate 44 having electronic components such as IC chips which constitute a drive control circuit, connectors for achieving electrical connections of the respective components, and sensing switches configured to sense the operations of the respective components arranged thereon is attached by screwing or the like. The bottom surface portion of the bottom case 4 is formed with base panel receiving seat surfaces 4d each having a screw hole 44a for screwing the circuit substrate 44 at three points, for example, so as to protrude therefrom. The bottom case 4 is also provided with a connector opening 4b configured to allow the connectors mounted on the circuit substrate 44 to be exposed toward the outside on a part of an outer peripheral wall thereof.

Figure 7:
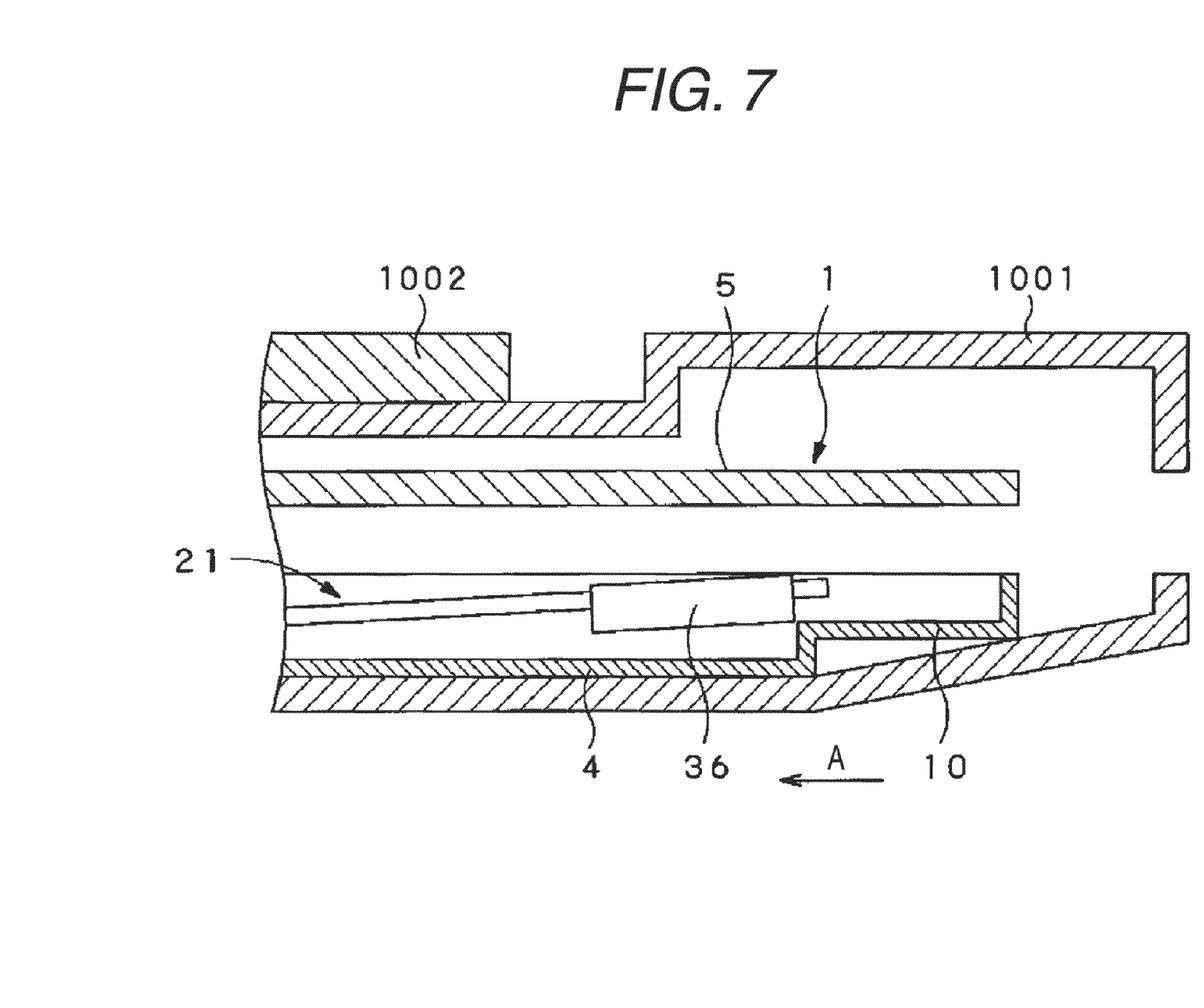
FIG. 7 is a cross-sectional view of a principal portion showing a shoulder formed on the front end side of the bottom case.

As shown in FIGS. 6A, 6B, and 7, the bottom case 4 is reduced in height in the height direction, that is, in thickness in the vicinity of the end portion on the side of the disc slot 19, and so that a shoulder 10 having a bottom level higher than the bottom surface portion is formed. The shoulder 10 of the bottom case 4 maybe formed from the disc slot 19 inwardly toward the back of the apparatus body 3 (the direction indicated by an arrow A in FIG. 7) to a position which does not interfere with a pickup base 36 positioned outermost side of the base unit 21 at maximum. The reason is that the interference of the shoulder 10 with an area where the pickup base 36 moves should be avoided when reducing the thickness of the entire apparatus because the member which occupies the thickness most is the pickup base 36.

The top cover 5 is attached to the bottom case 4 by screwing. Specifically, as shown in FIG. 5, a plurality of through holes 13 for allowing the screws 12 to penetrate therethrough are formed on receiving seat surfaces 13a provided on the inner surface of the disc drive apparatus 1 so as to protrude therefrom along an outer peripheral edge portion of the top panel portion 5a of the top cover 5. A plurality of guide strips 14 formed by bending inwardly substantially at a right angle are provided on the both side panel portions 5b. On the other hand, as shown in FIGS. 6A and 6B, a plurality of fixed strips 15 formed by being inwardly substantially at a right angle are provided along an outer peripheral edge portion of the bottom case 4, and the fixed strips 15 are each formed with a screw hole 16 corresponding to the through hole 13 of the top cover 5. The bottom case 4 includes a plurality of guide slits, not described in detail, which function to prevent the plurality of guide strips 14 of the top cover 5 from coming off formed on the both side surface portions thereof.

When attaching the top cover 5 to the bottom case 4, the top cover 5 is slid from the front side to the back side in a state in which the plurality of guide strips 14 of the top cover 5 are engaged with the plurality of guide slits of the bottom case 4. Accordingly, the top panel portion 5a of the top cover 5 closes the upper opening of the bottom case 4. In this state, the screws 12 are screwed into the screw holes 16 on the bottom case 4 through the plurality of through holes 13 of the top cover 5. The bottom case 4 includes a shaft hole 9 which functions as an axis of rotation in the hoisting and lowering operation of the base unit 21 formed in the vicinity of the outer peripheral edge portion thereon on the side of the disc slot 19. The bottom case 4 is also formed with a plurality of openings for allowing visual inspection or adjustment of the respective members disposed therein from the outside of the housing 3. For example, openings 4e for allowing adjustment of inclination (skew) of an optical pickup 28 in the base unit 21 are formed on the shoulder 10 of the bottom case 4 on the side of the disc slot 19. The shoulder 10 of the bottom case 4 is also formed with an opening 4f at a position where the conveyance drive motor 61 is fixed. It is based on the consideration that the height at the shoulder 10 is formed to be thinner, and hence the size of the conveyance drive motor 61 accommodated therein is small correspondingly. In other words, by removing part of the shoulder 10 of the bottom case 4 to form the opening 4f, the drive motor of a size increased by an amount corresponding to the thickness of the bottom case 4 may be used.

A slider 62 configured to transmit the drive force from the conveyance drive motor 61 for allowing the disc conveying mechanism 40 to perform a conveying operation of the optical disc 2 to the respective arms is slid on the bottom case 4. The bottom case 4 is formed with the anodic oxidation coating over the entire portion of the aluminum plate as a base material, so that the durability and the abrasion resistance property are improved, a sliding resistance generated by a sliding movement of the slider 62 of the conveyance drive mechanism 60 is restrained, and splash of cutting dust of the bottom case 4 caused by the sliding movement within the apparatus is restrained. Since the bottom case 4 may be reduced in thickness of the material while maintaining the equivalent strength, it contributes to reduction in thickness of the entire disc drive apparatus 1. In other words, while an aluminum plate having a thickness of 0.5 mm has been used as the bottom case in the related art, the same strength as in the related art is maintained in the bottom case 4 according to the embodiment of the present invention even when the thickness is reduced to 0.4 mm after the anodizing. Since the sliding property of the bottom case 4 is improved, an output of the conveyance drive motor 61 may be reduced, and hence a drive motor of a smaller scale may be employed, whereby the reduction in thickness of the entire disc drive apparatus 1 is achieved.

The bottom case 4 is formed with the shoulder 10, and the thickness reduction is achieved only partly in view of the entire part of the disc drive apparatus 1. However, with the provision of the shoulder 10 on the side of the disc slot 19, arrangement of the disc drive apparatus 1 at a position which allows the optical disc 2 to be ejected sufficiently is achieved even though the mounting position has a non-horizontal surface such as an inclined portion.

Since the shoulder 10 of the bottom case 4 may be accommodated in the apparatus body 1001 having various inclinations or curvatures, the design change depending on the apparatus body 1001 is not necessary, so that it is optimal for multi-purpose products. In addition, since the shoulder 10 is formed substantially horizontally as in the case of the bottom surface portion of the bottom case 4, arrangement and design of various components such as the circuit substrate and the drive motor are easier than the case of arrangement on the inclined surface.

In the bottom case 4, the anodic oxidation coating is peeled off from surfaces of the fixed strips 15 and the base panel receiving seat surfaces 4d opposing the top cover 5 and the circuit substrate 44. Therefore, in the disc drive apparatus 1, conductivity is secured via the portions from which the anodic oxidation coating is peeled off, and hence the grounding function thereof may prevent the electronic components from being adversely affected. The grounding function may be secured also in the top cover 5 as in the case of the bottom case 4, by peeling off the anodic oxidation coating from the receiving seat surfaces 13a which are connected to the top cover 5. Such peeling off of the anodic oxidation coating is performed by a known peeling method such as irradiation of laser or the like. The housing 3 shown in FIG. 2 is configured as described thus far.

As shown in FIG. 2, a substantially rectangular panel-shaped front panel 18 is attached to the front surface of the housing 3. The front panel 18 includes the rectangular disc slot 19 to allow the optical disc 2 to be inserted and ejected horizontally. In other words, the optical disc 2 is allowed to be inserted into the interior of the housing 3 from the disc slot 19 or to be ejected to the outside from the housing 3 from the disc slot 19. Panel curtains, not shown, are formed at both sides of the disc slot 19 in the direction orthogonal to the longitudinal direction thereof. The panel curtains being formed of non-woven fabric cut into an elongated shape are bonded to the back surface side of the front panel 18 with an adhesive agent or the like so as to prevent dust particles from entering the housing 3, and come into sliding contact with the disc surface when the optical disc 2 is inserted or ejected to remove the dust particles adhered thereto.

The front panel 18 is provided with a display unit 20 which indicates an access state with respect to the optical disc 2 by lighting up, and an eject button 17 pressed when ejecting the optical disc 2 on the front surface thereof.

The disc drive apparatus 1 is not limited to be a configuration having the front panel 18 as described above, and a configuration in which the front panel 18 is not provided, the disc drive apparatus 1 is mounted directly on the apparatus body 1001 of the laptop personal computer 1000, and the same configuration as the front panel 18 including the disc slot 19, the display unit 20, the eject button 17, and the panel curtains is provided on the apparatus body 1001 is also applicable.

Specifically, as shown in FIG. 7, when the apparatus body 1001 of the computer 1000 has a function of the front panel 18, it is not necessary to provide the front panel 18 on the disc slot 19 of the disc drive apparatus 1.

The bottom case 4 includes guide projection holes 4c and 4c in the vicinity of one side surface where the deck portion 4a is provided for allowing a pair of guide projections configured to cause the slider 62 of the conveyance drive motor 61, described later, to slide along the one side surface to stand upright.

Figure 4:
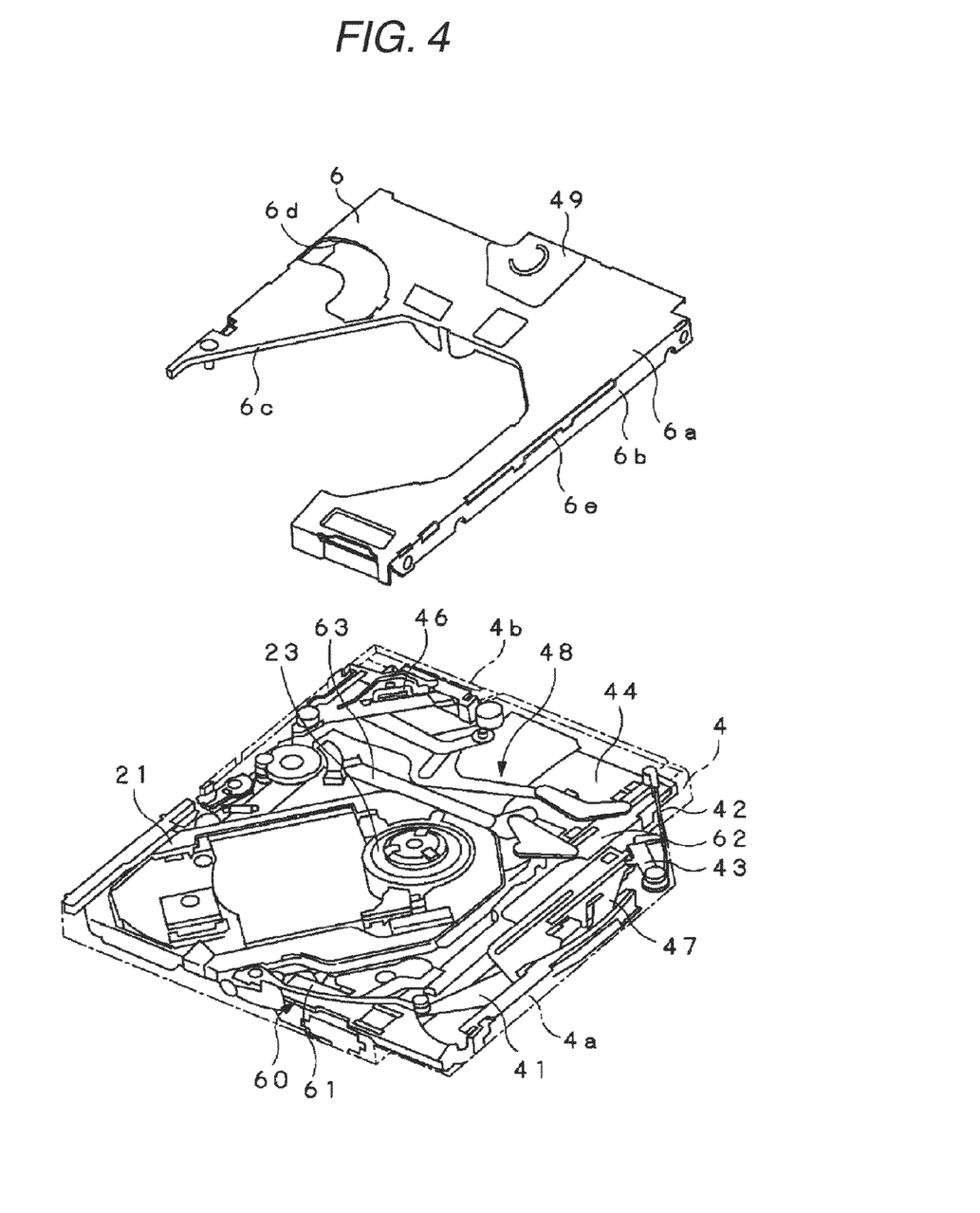
FIG. 4 is an exploded perspective view showing the disc drive apparatus from which a main chassis is removed.

As shown in FIG. 3 and FIG. 4, the main chassis 6 is attached to the bottom surface portion of the bottom case 4 by screwing. The main chassis 6 is arranged above the circuit substrate 44 so as to partition the interior of the bottom case 4 into upper and lower sections having the substantially same height as the deck portion 4a. Accordingly, the housing 3 includes a disc conveying area having the loading arm 41, an eject arm 46, and the deck arm 42 which are rotatably exposed on the top cover 5 side from the main chassis 6, and an area for disposing the conveyance drive motor 61 and the slider 62 and the like on the bottom case 4 side from the main chassis 6.

As shown in FIG. 4, the main chassis 6 is formed of a sheet metal formed into a substantially flat-panel shape, and includes an upper surface 6a configured to cover the bottom case 4 from the back side to the one side portion on which the deck portion 4a of the bottom case 4 is provided, and a pair of side panel portions 6b formed by bending the periphery of the upper surface 6a along the both side surfaces of the bottom case 4. The main chassis 6 includes a base opening 6c and an eject arm opening 6 d for allowing the base unit 21 and the eject arm 46 which constitutes the disc conveying mechanism 40 for ejecting the optical disc 2 to be exposed to the conveying area of the optical disc 2 on the upper surface 6a thereof, and a side panel opening 6e connected with the slider 62 to be slid by the conveyance drive motor 61 for allowing the insertion of a loading cam plate 47 for controlling the operation of the deck arm 42 and the regulating arm 43 on the side panel portion 6b on the side where the deck portion 4a is provided. Engaged on the upper surface 6a of the main chassis 6 on the bottom case 4 side are the eject arm 46 of the disc conveying mechanism 40 configured to convey the optical disc 2 into and out of the housing 3, an operating arm 48 configured to transmit the drive force of the conveyance drive motor 61 and operate the eject arm 46, and a guide cam 49 configured to guide the movement of the respective arms.

The main chassis 6 is provided with a plurality of guide strips on the both side panel portions 6b as in the case of the bottom case 4, is formed with through holes for the fixation with the bottom case 4. On the bottom case 4 side as well, screw holes are formed corresponding to these through holes, so that the main chassis 6 is fixed thereto by screwing the screws therein.

Figure 8:
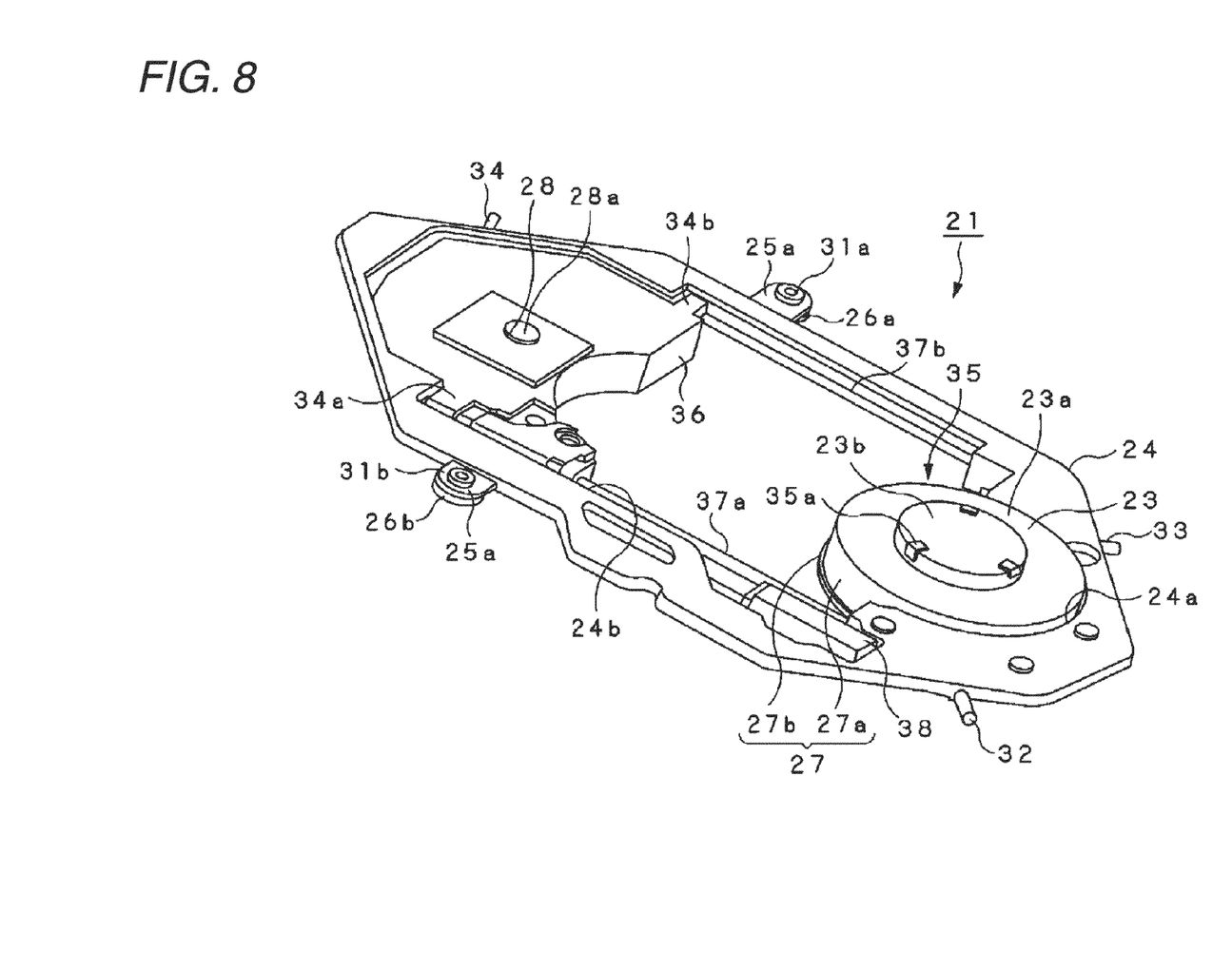
FIG. 8 is a perspective view showing a base unit.

The disc drive apparatus 1 is provided with the base unit 21, which is the disc recording and reproducing unit on the bottom surface portion of the bottom case 4. As shown in FIG. 8, the base unit 21 includes a base chassis 24 formed of a substantially rectangular frame body and is fixed to the main chassis 6 and the bottom case 4 via dampers 26a and 26b provided on connecting strips 25a and 25b of the base chassis 24. Then, one end of the base unit 21 in terms of the longitudinal direction is positioned at a substantially center of the housing 3 by the base chassis 24 being disposed on the main chassis 6 and the bottom case 4 via the dampers 26a and 26b. The base unit 21 includes a disc loading unit 23 on which the optical disc 2 inserted into the interior of the housing 3 from the disc slot 19 is loaded and a disc rotation drive mechanism 27 configured to rotate the optical disc 2 loaded on the disc loading unit 23 at the one end in terms of the longitudinal direction. The base unit 21 also includes an optical pickup 28 configured to write or read signals with respect to the optical disc 2 rotated by the disc rotation drive mechanism 27 and a pickup feeding mechanism configured to convey the optical pickup 28 along the longitudinal direction for moving the same in a radial direction of the optical disc 2, and these members are provided integrally with the base chassis 24. The base chassis 24 of the base unit 21 is hoisted and lowered with respect to the optical disc 2 by the base hoisting and lowering mechanism 50.

The base unit 21 is exposed to the disc conveying area from the base opening 6c of the main chassis 6 so that the disc loading unit 23 is positioned at a substantially center on the bottom surface portion of the bottom case 4. The base unit 21 is able to be hoisted and lowered by the base hoisting and lowering mechanism 50 and, in an initial state, is positioned below the optical disc 2 to be inserted into the interior of the housing 3 from the disc slot 19, and is hoisted in association with the loading operation of the optical disc 2 to rotatably engage the optical disc 2. The base unit 21 is lowered by the base hoisting and lowering mechanism 50 after the recording and reproducing operation, is released from the engagement with the optical disc 2, and is retracted from the conveying area of the optical disc 2.

The base chassis 24 is formed by punching a sheet metal into a predetermined shape, and bending the periphery thereof slightly downward. The base chassis 24 is continuously formed with a substantially semicircular shaped table opening 24a for allowing the turn table 23a of the disc loading unit 23, described later, to be exposed upward, and a substantially rectangular shaped pickup opening 24b for allowing an objective lens 28a of the optical pickup 28 to be exposed upward on a main surface thereof. As shown in FIG. 3, a decorative panel 30 having openings corresponding to the openings 24a and 24b is attached to the upper surface of the base chassis 24.

The base chassis 24 is formed with a guide panel 30a configured to prevent the optical disc 2 from coming into contact with the base chassis 24, and guide the optical disc 2 toward a supporting portion of the eject arm 46 at an end opposite from the disc loading unit 23. The guide panel 30a includes a fiber sheet, not shown, adhered thereto, so that a signal recording surface of the optical disc 2 is prevented from being scratched even when the optical disc 2 comes into sliding contact thereto.

The base chassis 24 includes connecting strips 25a and 25b to be connected to the main chassis 6 and the bottom case 4 via the dampers 26a and 26b projecting from the both side surfaces in the longitudinal direction. The dampers 26a and 26b engage the respective connecting strips 25a and 25b, and the dampers 26a and 26b are formed with insertion holes 31a and 31b in which pins are inserted.

The base chassis 24 includes a first spindle 32 positioned on a side surface thereof opposing the slider 62 on the disc loading unit 23 side for being engaged and supported by a cam slit provided on the slider 62, a second spindle 33 connected to the slider 62 of the disc conveying mechanism 40 via an arm and positioned on a side surface thereof opposing a sub slider 63, which slides on the bottom case 4 in the same manner as the slider 62, on the disc loading unit 23 side for being engaged and supported by a cam slit of the sub slider 63, and a third spindle 34 positioned on a side surface opposite from the side surface opposing the slider 62 on the front surface side for being rotatably supported by the shaft hole 9 formed on the bottom case 4.

Therefore, the base chassis 24 is configured in such a manner that the disc loading unit 23 side thereof is rotated about the third spindle 34 to hoist and lower the base unit 21 by the sliding movement of the first spindle 32 within the cam slit of the slider 62 and the sliding movement of the second spindle 33 within the cam slit of the sub slider 63 in association with the sliding movement of the slider 62 and the sub slider 63.

The disc loading unit 23 includes the turn table 23a to be rotated by the disc rotation drive mechanism 27, and the chucking mechanism 35 for loading the optical disc 2 is provided at the center portion of the turn table 23a. The chucking mechanism 35 includes the engaging projection 23b to be engaged with the center hole 2a of the optical disc 2 and a plurality of engaging claws 35a configured to engage the periphery of the center hole 2a of the optical disc 2 to be engaged with the engaging projection 23b, so that the optical disc 2 is held on the turn table 23a.

The disc rotation drive mechanism 27 includes a flat-shaped spindle motor 27a which rotates the optical disc 2 integrally with the turn table 23a, and the spindle motor 27a is attached to a lower surface of the base chassis 24 by screwing via a supporting panel 27b so that the turn table 23a provided on an upper surface thereof projects slightly from the table opening 24a of the base chassis 24.

The optical pickup 28 includes an optical block configured to converge a light beam emitted from a semiconductor laser as a light source by the objective lens 28a, irradiate the signal recording surface of the optical disc 2 with the beam, and detect a returned light beam reflected from the signal recording surface of the optical disc 2 by a light detector including a light receiving element or the like, and is configured to write or read signals with respect to the optical disc 2.

The optical pickup 28 includes an objective lens drive mechanism such as a biaxial actuator configured to displace the objective lens 28a in the direction of optical axis (referred to as a focusing direction) and a direction orthogonal to a recording track of the optical disc (referred to as a tracking direction), and controls driving such as a focus servo for causing the objective lens 28a to be focused on the signal recording surface of the optical disc 2 or a tracking servo for causing a spot of the light beam converged by the objective lens 28a to follow the recording track while shifting the objective lens 28a in the focusing direction and the tracking direction by the biaxial actuator on the basis of the detected signal from the optical disc 2 detected by the above-described light detector. As the objective lens drive mechanism, a triaxial actuator which is able to adjust the inclination (skew) of the objective lens 28a with respect to the signal recording surface of the optical disc 2 so as to irradiate vertically the signal recording surface of the optical disc 2 with the light beam converged by the objective lens 28 a in addition to the focusing control and the tracking control as described above may be employed.

The pickup feeding mechanism includes the pickup base 36 on which the optical pickup 28 is mounted, a pair of guide shafts 37a and 37b that support the pickup base 36 so as to be slidable in the radial direction of the optical disc 2, and a displacement drive mechanism 38 having a drive motor configured to displace the pickup base 36 supported by the pair of guide shafts 37a and 37b in the radial direction of the optical disc 2 and a lead screw.

The pickup base 36 is formed with guide strips 34a and 34b to be guided by the pair of guide shafts 37a and 37b, and the displacement drive mechanism 38 displaces the optical pickup 28 along the guide shafts 37a and 37b.

As shown in FIG. 4, the base unit 21 is mounted in the interior of the housing 3 so that the disc loading unit 23 is positioned at a substantially center of the bottom case 4. When the optical disc 2 is inserted and is retracted in and ejected from the housing 3 by the disc conveying mechanism 40, it is preferable to secure a wide disc conveying area. Therefore, the base unit 21 is hoisted and lowered by the base hoisting and lowering mechanism 50, and is positioned at the lowered position when the disc is conveyed. At this time, the pickup base 36 is configured to be positioned in the vicinity of the shaft hole 9 as a rotational pivot, that is, on the outermost side which is a farthest position from the disc loading unit 23 in order to alleviate a load exerted on the hoisting and lowering movement.

The disc drive apparatus 1 includes the disc conveying mechanism 40 which performs a series of conveying operation including inserting the optical disc 2 from the disc slot 19, starting the retraction of the optical disc 2 into the interior of the housing 3, positioning and loading the optical disc 2 to the turn table 23a of the disc loading unit 23 and, after having completed the recording and reproducing operation, and ejecting the optical disc 2 from the disc slot 19.

The disc conveying mechanism 40 includes the loading arm 41, the eject arm 46, and the deck arm 42 configured to be pivotable in a plane parallel to a main surface of the optical disc 2 as a supporting member moved between the upper surface 6a of the main chassis 6 and a main surface opposing the disc loading unit 23 of the top panel portion 5a.

The eject arm 46 of the disc conveying mechanism 40 has a rotational pivot on the main chassis 6 in the vicinity of the side panel portion opposite from the deck portion 4a, and is configured to be pivotable in the plane parallel to the main surface of the optical disc 2 in the conveying area of the optical disc 2 to be inserted and ejected. The loading arm 41, being configured to be pivotable in the same plane as the eject arm 46 in the conveying area of the optical disc 2 on the side of the disc slot 19 of the deck portion 4a, supports the rear end portion of the inserted optical disc 2 in terms of the direction of insertion and retracts the optical disc 2. The deck arm 42, having a rotational pivot on the deck portion 4a, is urged in the ejecting direction, prevents the erroneous insertion of the optical disc having a small diameter of 8 cm in diameter, and centers the optical disc 2 having a large diameter. The respective arms are connected to the conveyance drive mechanism 60, and center the optical disc 2 when inserting or ejecting the optical disc 2 and loading the same on the disc loading unit 23 by the drive force of the conveyance drive motor 61 transmitted thereto. The respective arms of the disc conveying mechanism 40 are connected to the guide cam 49 by the connecting members such as the plurality of operating arms 48, and are moved according to the guide of the guide cam 49. The deck arm 42 and the loading arm 41 of the disc conveying mechanism 40 are connected to the loading cam plate 47, and move along a cam groove formed on the loading cam plate 47.

The disc drive apparatus 1 is provided with the base hoisting and lowering mechanism 50 configured to hoist and lower the base unit 21 for loading the optical disc 2 conveyed into the housing 3 on the disc loading unit 23 of the base unit 21 by the disc conveying mechanism 40.

Figure 9A:
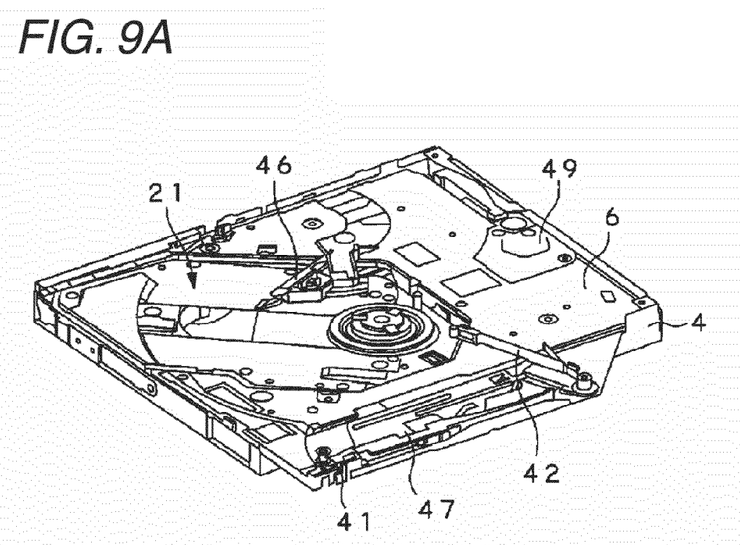
FIG. 9A is a general perspective view showing a state in which the base unit is at a lowered position.
Figure 9B:
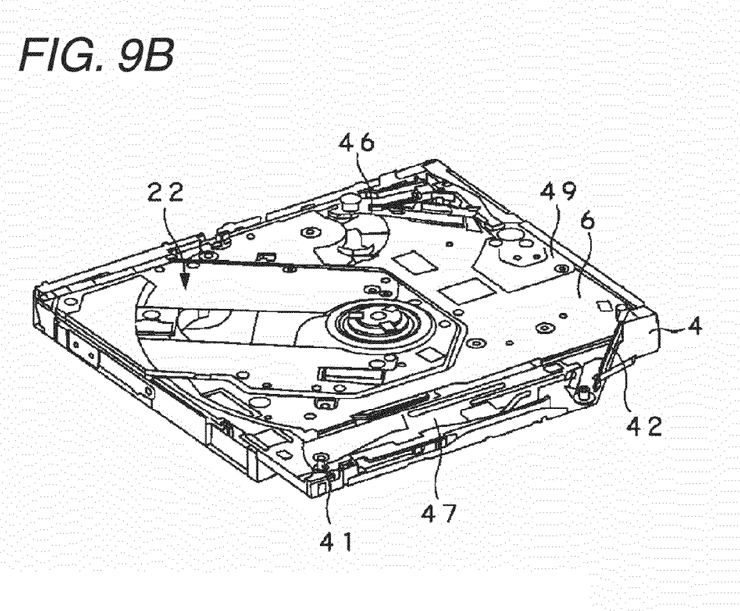
FIG. 9B is a general perspective view showing a state in which the base unit is at a hoisted position.

The base hoisting and lowering mechanism 50 includes the slider 62 and the sub slider 63 and, as shown in FIGS. 9A and 9B, the sliders slide on the bottom case 4, so that the base unit 21 is hoisted and lowered by following the first spindle 32 and the second spindle 33 of the base chassis 24 which slide in the cam slits formed on the respective sliders.

The disc drive apparatus 1 further includes the disc conveying mechanism 40 and the conveyance drive mechanism 60 configured to transmit a drive force to the base hoisting and lowering mechanism 50. The conveyance drive mechanism 60 includes the conveyance drive motor 61 which generates the drive force, the slider 62 connected to the conveyance drive motor 61, the sub slider 63 connected to the slider 62 via a connecting member such as a link arm, and connecting members for connecting the respective sliders and the disc conveying mechanism.

The conveyance drive mechanism 60 is configured to convert a rotational drive force from the conveyance drive motor 61 into a linear drive force by the slider 62 formed with a line tooth gear and transmit the linear drive force of the slider 62 to the eject arm 46 of the disc conveying mechanism 40 via the connecting members or to the loading arm 41 and the deck arm 42 via the loading cam plate 47. The conveyance drive mechanism 60 transmits the drive force to the disc conveying mechanism 40, and the disc conveying mechanism 40 transmitted with the drive force performs insertion, positioning and ejection of the optical disc 2. The conveyance drive mechanism 60 transmits the drive force to the base hoisting and lowering mechanism 50 to hoist and lower the base unit 21. The slider 62, the sub slider 63, and the loading cam plate 47 of the conveyance drive mechanism 60 slide respectively on the bottom case 4. At this time, the anodic oxidation coating is formed on the portion of the bottom case 4 where the respective members slide to reduce the sliding resistance, so that a smooth sliding is achieved. Accordingly, the output of the conveyance drive motor 61 for causing the respective members to slide may be reduced.

In the disc drive apparatus 1 having the configuration as described above, the bottom case 4 of the housing 3 is formed with the anodic oxidation coating in the sliding area for at least the slider 62 or the like, that is, at a position where the sliding member slides, so that the sliding resistance is reduced. The strength of the bottom case 4 by itself is enhanced by the formation of the anodic oxidation coating, and hence the thickness may be reduced, so that the reduction in thickness of the disc drive apparatus 1 is achieved while maintaining the strength thereof. The reduction in weight is also achieved because the thickness is reduced. In addition, in the disc drive apparatus 1, the bottom case 4 is connected to the top cover 5 and the circuit substrate 44 with the anodic oxidation coating at the contact points therebetween peeled off, so that the sufficient grounding function is expected. In addition, in the disc drive apparatus 1, for example, when the anodic oxidation coating is formed entirely over the bottom case 4, coloring may be performed simultaneous with the process of formation of the anodic oxidation coating, so that the apparatus superior also in design may be formed easily.

The disc drive apparatus 1 is provided with the shoulder 10 on the bottom case 4, and the thickness reduction is achieved only partly in view of the entire part of the disc drive apparatus 1. However, arrangement of the disc drive apparatus 1 at the position which allows the optical disc 2 to be ejected sufficiently is achieved even though the mounting position has the non-horizontal surface such as the inclined portion.

The disc drive apparatus 1 has been described under the assumption that the anodic oxidation coating is formed only on the housing 3. However, the invention is not limited thereto, and the anodic oxidation coating may be formed at the positions subjected to the sliding movement (sliding areas) also on the members which are also subjected to the sliding movement such as the main chassis 6 with respect to the eject arm 46 from among the members which constitute the disc conveying mechanism 40, the base hoisting and lowering mechanism 50, and the conveyance drive mechanism 60. In this manner, with the formation of the anodic oxidation coating also on the main chassis 6, the sliding resistance of the sliding members such as the arms may be reduced, and enhancement of the rigidity as the chassis is also achieved. In other words, the thickness may be reduced with the same strength, and hence weight reduction is also achieved, so that the output of the conveyance drive motor 61 as a drive source is reduced owing to the reduced sliding resistance. Consequently, the size of the drive source may be reduced, so that the reduction in thickness of the entire disc drive apparatus 1 is achieved.

In the disc drive apparatus 1, the disc conveying mechanism 40 includes the eject arm 46, the loading arm 41, and the deck arm 42, and the movement such as the insertion and the ejection of the optical disc 2 is achieved by the drive force transmitted to these arms from the conveyance drive mechanism 60. However, the invention is not limited thereto, and any known disc conveying mechanism applied to the disc drive apparatus in which the optical disc 2 is inserted into the housing 3 and ejected out of the housing 3, that is, of the slot-in type may be employed. Also, the conveyance drive mechanism 60 is not limited to the configuration in which the drive force from the conveyance drive motor 61 is transmitted by the slider 62 and the sub slider 63, and any mechanism may be employed as long as it includes sliding members which slide with respect to the members which constitute the housing 3 in the housing 3, that is, members such as the top cover 5 and the bottom case 4. The invention may be applied to any conveyance drive mechanism as long as it is the conveyance drive mechanism having the sliding members.

The disc drive apparatus 1 is not limited to the configuration in which the shoulder 10 is formed substantially horizontally as in the case of the bottom surface portion, as shown in FIG. 7 and the shoulder 10 may be inclined so as to follow the inclined portion of the apparatus body 1001 of the computer 1000.

Subsequently, the durability of the disc drive apparatus 1 in the configuration as described above as the apparatus, that is, the result of an aging test will be described.

As the aging test, using the above-described disc drive apparatus 1 having the housing 3 formed with the anodic oxidation coating and a disc drive apparatus having a housing 3 which is not formed with the anodic oxidation coating, an insertion process from the insertion of the optical disc 2 until the loading of the optical disc 2 on the disc loading unit 23, and an ejecting process from the removal of the optical disc 2 from the disc loading unit 23 until the ejection from the disc slot 19 were carried out by 30,000 times respectively. Then, the loads applied to the conveyance drive motor 61 at the initial timing at the respective processes and the loads applied to the conveyance drive motor 61 after having terminated by 30,000 times were evaluated, respectively. The results of evaluation are shown in Table 1 below.

TABLE 1

| | | load % (with anodizing) | load % (without anodizing) |
| --- | --- | --- | --- |
| insertion process | before aging | 35 | 41 |
| | after aging | 37 | 50 |
| ejecting process | before aging | 28 | 27 |
| | after aging | 27 | 33 |

From the results of evaluation, it was found that the load applied to the conveyance drive motor 61 was larger in the case of the insertion process of the optical disc 2 than the ejecting process. It seemed to be because the insertion process was associated with the hoisting and lowering operation of the base unit 21 by the base hoisting and lowering mechanism 50. From the results depending on with or without anodizing in the initial state before aging, it was apparent that the load applied to the disc drive apparatus having applied with the anodizing was lower in the insertion process. It was estimated to be because the sliding resistance is lowered by the anodizing, that is, by the formation of the anodic oxidation coating.

In comparison between before and after the aging, the load was not increased in any process in the case of the disc drive apparatus having applied with the anodizing. In contrast, it is understood that the load was increased by 6 to 9% in the disc drive apparatus which was not applied with the anodizing. It was estimated that the reduction of the sliding resistance and the maintenance of the reduced state were achieved in the disc drive apparatus having applied with the anodizing. Consequently, it was clear that the durability was improved as the disc drive apparatus.

The present application contains subject matter related to that disclosed in Japanese Priority Patent Application JP 2008-162590 filed in Japan Patent Office on Jun. 20, 2008, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disc drive apparatus comprising:
an apparatus body to which a disc is inserted and from which the disc is ejected;
a disc recording and reproducing unit having:
a disc loading unit configured to load the disc inserted into the apparatus body;
a disc rotation drive mechanism configured to rotate the disc when loaded onto the disc loading unit;
an optical pickup configured to record and/or reproduce a data signal with respect to the disc; and
a pickup feeding mechanism configured to convey the optical pickup in a radial direction of the disc;
a disc conveying mechanism configured to insert the disc into the apparatus body and eject the disc from the apparatus body; and
a conveyance drive mechanism provided in the apparatus body and configured to drive the disc conveying mechanism,
wherein the apparatus body includes a bottom surface portion, the bottom surface portion including a shoulder extending across an insertion end of the apparatus body, the shoulder having:
a length, the length extending along a first direction substantially parallel to the insertion direction of the disc;
a width, the width extending along a second direction perpendicular to the first direction, the width being greater than the length; and
a bottom level, the bottom level extending along the first direction and being higher than the bottom surface portion of the apparatus body away from the shoulder.

2. The disc drive apparatus according to claim 1, wherein the shoulder of the bottom surface portion is formed on a side of the insertion end of the disc in a range from an outermost position of a pickup base on which the optical pickup is mounted to the insertion end of the disc.

3. The disc drive apparatus of claim 1, wherein the bottom level of the shoulder is substantially parallel to the bottom surface portion of the apparatus body.

4. The disc drive apparatus of claim 3, wherein the shoulder forms a step across the insertion end of the apparatus body.

5. An electronic instrument comprising:
an instrument body having a horizontal surface portion, an inclined surface portion continuing from a horizontal surface portion, and an opening opened in a vicinity of the inclined surface portion and to which a disc is inserted and from which the disc is ejected; and
a disc drive apparatus including:
an apparatus body to which the disc is inserted and from which the disc is ejected;
a disc recording and reproducing unit having:
a disc loading unit configured to load the disc inserted into the apparatus body;
a disc rotation drive mechanism configured to rotate the disc loaded onto the disc loading unit;
an optical pickup configured to record and/or reproduce a data signal with respect to the disc; and
a pickup feeding mechanism configured to convey the optical pickup in a radial direction of the disc;
a disc conveying mechanism configured to insert the disc into the apparatus body and eject the disc from the apparatus body; and
a conveyance drive mechanism provided in the apparatus body and configured to drive the disc conveying mechanism,
wherein the apparatus body includes a bottom surface portion, the bottom surface portion including a shoulder adjacent to the inclined surface portion extending across an insertion end of the apparatus body, the shoulder having:
a length, the length extending along a first direction substantially parallel to the insertion direction of the disc;
a width, the width extending along a second direction perpendicular to the first direction, the width being greater than the length; and
a bottom level, the bottom level extending along the first direction and being higher than the bottom surface portion of the apparatus body away from the shoulder.

6. A disc drive apparatus comprising:
an apparatus body to which a disc is inserted and from which the disc is ejected;
a disc recording and reproducing unit having:
a disc loading unit configured to load the disc inserted into the apparatus body;
a disc rotation drive mechanism configured to rotate the disc when loaded onto the disc loading unit;
an optical pickup configured to record and/or reproduce a data signal with respect to the disc; and
a pickup feeding mechanism configured to convey the optical pickup in a radial direction of the disc;
a disc conveying mechanism configured to insert the disc into the apparatus body and eject the disc from the apparatus body; and
a conveyance drive mechanism provided in the apparatus body and configured to drive the disc conveying mechanism,
wherein the apparatus body includes a bottom surface portion, the bottom surface portion including a shoulder extending across an insertion end of the apparatus body, the shoulder having:
a length, the length extending along a first direction substantially parallel to the insertion direction of the disc;
a width, the width extending along a second direction perpendicular to the first direction and extending over the center of the insertion end of the disc; and
a bottom level, the bottom level extending along the first direction and being higher than the bottom surface portion of the apparatus body away from the shoulder.

7. The disc drive apparatus of claim 6, wherein the width of the shoulder is greater than the length of the shoulder.